(No Model.)
J. W. RHOADES.
OIL WELL PUMPING APPARATUS.
No. 558,421.  Patented Apr. 14, 1896.
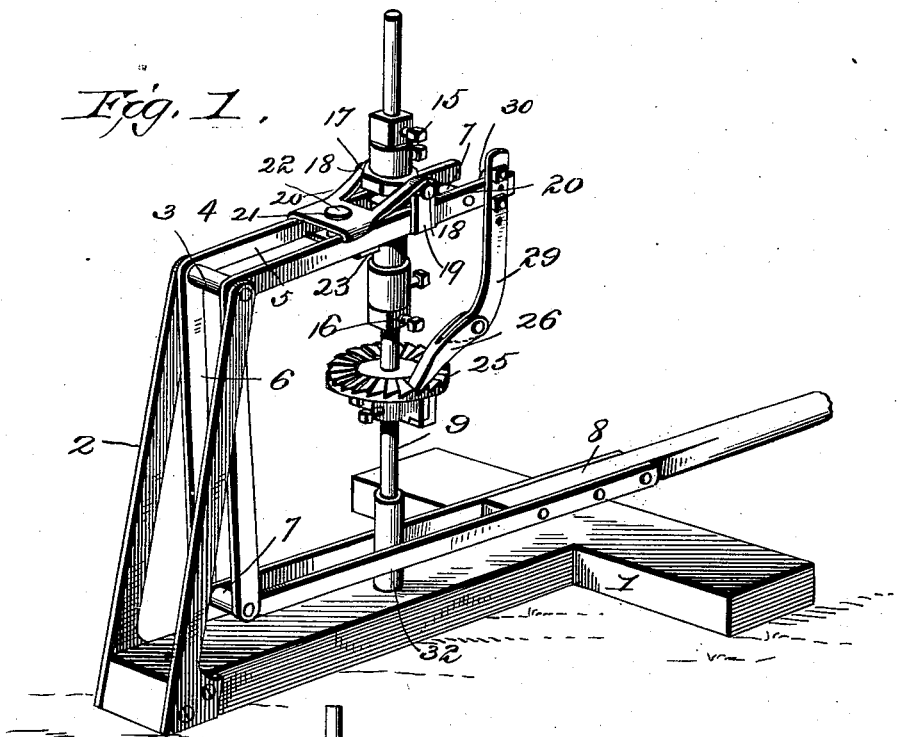
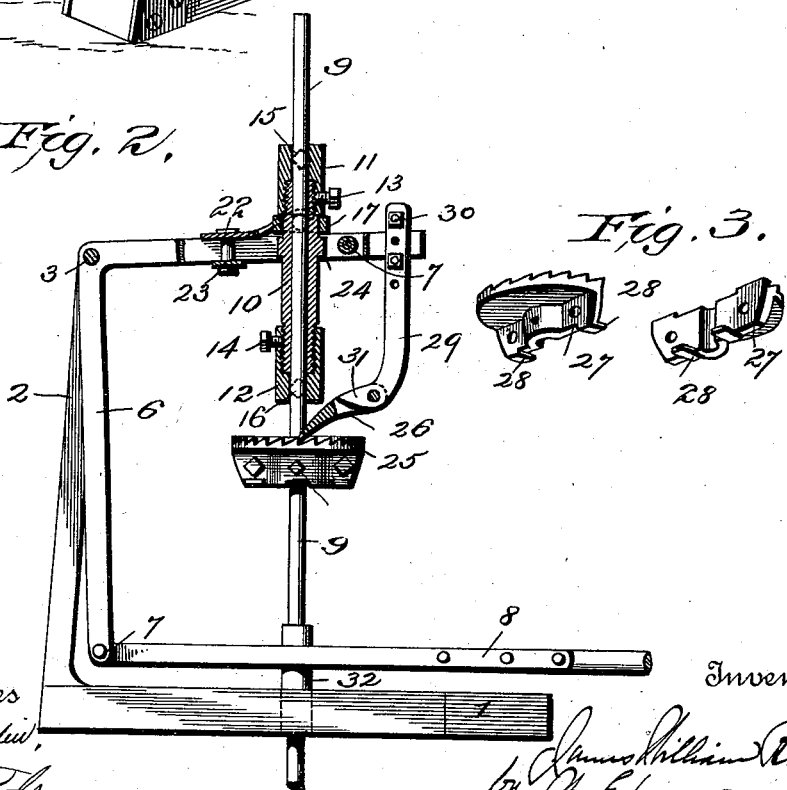
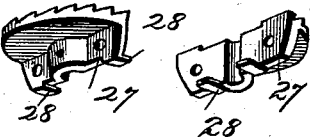
Witnesses  Inventor

UNITED STATES PATENT OFFICE.

JAMES WILLIAM RHOADES, OF FOSTORIA, OHIO.

OIL-WELL-PUMPING APPARATUS.

SPECIFICATION forming part of Letters Patent No. 558,421, dated April 14, 1896.

Application filed November 23, 1895. Serial No. 569,905. (No model.)

*To all whom it may concern:*

Be it known that I, JAMES WILLIAM RHOADES, a citizen of the United States, residing at Fostoria, in the county of Seneca and State of Ohio, have invented certain new and useful Improvements in Oil-Well-Pumping Apparatus; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to oil-pumps, and has for its object to provide improved means for revolving the polish-rod, and also improved means for reciprocating the polish-rod to which the usual pump-rods are connected.

It has further for its object to provide means for adjusting the parts by which the pump-rods are suspended through the polish-rod and thus compensate for the change in the length of the rods.

To the accomplishment of the foregoing and such other objects as may hereinafter appear, the invention consists in the construction and also in the combination of parts hereinafter particularly described, and then sought to be specifically defined by the claims, reference being had to the accompanying drawings, forming a part hereof, and in which—

Figure 1 is a perspective of the apparatus; Fig. 2, a side elevation with parts in vertical section; Fig. 3, a detail perspective of the two parts of the ratchet-wheel separated from each other.

In the drawings, the numeral 1 designates the base of the machine or device, from which rise the two standards 2, which have fulcrumed to their upper ends, by a pivot-bolt 3, a rocking beam 4, made in the form of a bell-crank and fulcrumed at the angle of its two arms, by the pivot-bolt 3, to the upper end of the standards 2. Each of the arms of this beam is preferably composed of two parallel bars 5 and 6, held apart by the spacing-thimbles 7, and to the lower end of the depending arm of the rock-beam is pivotally connected the end of an operating-lever 8.

The polish-rod (designated by the numeral 9) is suspended from the upper arm of the rocking beam 4 by means of a sleeve 10, which encircles the polish-rod and is provided at its upper end with an adjustable nut or head 11 and at its lower end with an adjustable nut or head 12, the two nuts being connected to the sleeve by threading the opposite ends of the sleeve, so that the nuts or threads may be screwed thereon. The nuts or heads are held against turning on the sleeve by means of set-screws 13 and 14, and the polish-rod is held within the sleeve by means of set-screws 15 and 16, which pass through the nuts or heads and bite against the polish-rod. The sleeve 10, carrying the polish-rod, is suspended from the upper arm of the rocking beam 4 by means of a collar 17, provided with pintles 18, which rest in boxes 19, so that the collar may rock or oscillate as the upper arm of the rock-beam 4 is raised and lowered and thus preserve the vertical position of the sleeve and the polish-shaft carried thereby. The sleeve 10 preferably fits loosely in the collar 17, and it rests upon said collar by the under face of the nut or head 11 bearing against the top of the collar. The pintles 18 of the collar are held in their boxes 19 by means of arms 20, extending across the top of the pintles and projecting from a plate 21, which is suitably bolted to the upper arm of the rock-beam 4, for instance, by a bolt 22, passing through the plate 21 and through a plate 23, lying across the under side of said arm of the rock-beam. A collar 24, fixed to the sleeve 10, beneath the loose collar 17, will prevent or limit the upward movement of the sleeve. This construction permits the polish-rod to be raised and lowered in a straight line when the rock-beam 4 is moved through the instrumentality of the lever 8, and at the same time the sleeve 10 and the polish-rod carried thereby are free to be rotated, so that the polish-rod and the usual pump-rods that will be connected thereto may have a vertical as well as a rotary motion in the well.

The rotary motion is imparted to the sleeve 10 and its polish-rod 9 by a ratchet 25, connected to the polish-rod, and a pawl 26, having a connection with the upper arm of the rock-beam 4. The ratchet 25 is formed in two parts, as clearly illustrated in Fig. 3 of the drawings, each part being provided with a depending flange 27, so that bolts may pass therethrough in order to clamp the ratchet to the polish-rod. In order to insure the top face of the two parts of the ratchet being held flush with each other, each flange 27 is formed with laterally-extending lips 28, the lips of one part projecting under the flange of the other part of the ratchet, so that one part cannot rise above the other, and consequently the top faces of the two parts are held flush. This construction also permits the ratchet to be attached to and detached from the polish-rod without removal of any of the other parts of the device. The pawl 26 is pivoted to the lower end of an arm 29, which is suitably attached to one end of the upper arm of the rock-beam 4, for instance, by means of clip-bolts 30. The end of the pawl 26 which is pivoted to the arm 29 is bifurcated, as illustrated, and the lower end of the arm 29 is provided with a finger 31, which enters the bifurcation of the pawl and prevents the pawl from being lifted out of engagement with the teeth of the ratchet 25 and yet permits the pawl to swing or drop as the arm 29, attached to the rock-beam, is lifted with the rock-beam, thus always insuring connection between the pawl and ratchet.

When it is desired to adjust the length of the polish-rod and the ordinary pump-rods that will be attached thereto, the ratchet 25 is detached from the polish-rod, and the lower nut or head 12 of the sleeve 10 is disconnected from the sleeve and lowered until it rests upon the stuffing-box, which may be represented by the part 32, and then it is secured to the polish-rod at that point by the set-screw 16, so that the polish-rod will be supported while the sleeve 10 is loosened from its connection with said rod. The set-screws 13 and 15 of the upper nut or head 11 are now loosened, and the nut or head 11 then partially unscrewed, so as to permit the sleeve 10 to drop until the under side of the nut or head 11 again rests upon the top of the loose collar 17. This brings the sleeve 10 to a lower point on the polish-rod, at which point the rod and sleeve are again secured together by tightening the set-screws 13 and 15, and as the nut or head 11 now rests again upon the loose collar 17 the lower nut or head 12 is loosened from connection to the polish-rod and lifted into engagement with the lower threaded end of the sleeve 10 and after being screwed thereon is held in place by the set-screws 14 and 16. This adjustment of the parts causes the sleeve 10 to grip the polish-rod at a lower point than before, and consequently the throw or lift of the polish-rod is correspondingly changed. It is obvious that if it be desired to change in the opposite direction the point at which the sleeve shall grip the polish-rod it is only necessary to loosen the nuts or heads and shift the sleeve in the opposite direction to that just described.

In operation in order to reciprocate the polish-rod and its attached pump-rod and at the same time to rotate the same it is only necessary to move the lever 8 back and forth, which movement alternately pulls and pushes on the lower end of the depending arm of the rock-beam and consequently raises and lowers the upper arm so as to reciprocate the polish-rod, the extent of the reciprocation depending on the length of movement of the lever 8, and at the same time the polish-rod is rotated by the pawl connected with the upper arm of the rock-beam engaging the teeth of the ratchet on the polish-rod, the extent of the rotation in each movment depending on the extent of movement of the lever 8. The longer the movement of that lever the greater the throw of the pawl and consequently the greater the extent of rotation of the polish-rod.

The construction described also affords such a leverage that the operation of the device is comparatively easy. The parts can also be readily adjusted to suit the conditions that may exist and render adjustment necessary or desirable. The construction is also comparatively simple and inexpensive.

I have illustrated and described with particularity the preferred details of construction and arrangement of the several parts; but it is obvious that changes can be made therein without departing from the essential features of the invention.

Having described my invention and set forth its merits, what I claim is—

1. In an oil-pumping apparatus, the combination of the polish-rod, the sleeve through which said rod passes, means for adjustably securing the rod to the sleeve so that they will rotate together, removable heads secured to both the upper and lower ends of the sleeve, a working beam, the collar journaled to the working beam and having the sleeve passing through it and supporting the sleeve and polish-rod from the beam, the ratchet-wheel adapted to be removed from the rod without removing the sleeve, and the pawl connected with the beam and engaging the ratchet-wheel, substantially as and for the purposes described.

2. In an oil-well-pumping apparatus, the combination of the rocking beam, the polish-rod, the sleeve encircling said rod, nuts or heads attached to the opposite ends of said sleeve, means for securing the sleeve and polish-rod together, and a collar swiveled to the upper arm of the rocking beam, said sleeve passing through and resting upon said collar, substantially as and for the purposes described.

3. In an oil-well-pumping apparatus, the combination of the rocking beam, the polish-rod and adjustable sleeve connected thereto, the collar having pintles resting in boxes secured to the upper arm of the rocking beam, and the arms attached to the rocking beam and fitting over the pintles of said collar, said sleeve passing through and resting upon said collar, substantially as and for the purposes described.

4. In an oil-well-pumping apparatus, the combination of the rocking beam, the polish-rod connected therewith, the two-part ratchet-wheel secured to said polish-rod and provided with lips extending from one part of the ratchet-wheel to and under the opposite part to preserve the faces of the two parts flush with each other, and the pawl connected with the rocking beam for rotating said ratchet, substantially as and for the purposes described.

In testimony whereof I affix my signature in presence of two witnesses.

JAMES WILLIAM RHOADES.

Witnesses:
GEO. W. SCHIFFER,
HOWARD T. NOBLE.